United States Patent
Kim et al.

(10) Patent No.: US 9,973,248 B2
(45) Date of Patent: May 15, 2018

(54) PER-STREAM CHANNEL GAIN FEEDBACK-BASED MULTI-STREAM MU-CQI ESTIMATION METHOD AND APPARATUS

(71) Applicants: Samsung Electronics Co., Ltd., Gyeonggi-do (KR); Industry-Academic Cooperation Foundation, Yonsei University, Seoul (KR)

(72) Inventors: Younsun Kim, Gyeonggi-do (KR); Sooyong Choi, Seoul (KR); Taehyoung Kim, Seoul (KR); Kyungsik Min, Seoul (KR); Jungkyun Park, Seoul (KR); Juho Lee, Gyeonggi-do (KR); Hyojin Lee, Gyeonggi-do (KR); Minchae Jung, Seoul (KR); Hyoungju Ji, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 66 days.

(21) Appl. No.: 14/764,086

(22) PCT Filed: Jan. 29, 2014

(86) PCT No.: PCT/KR2014/000875
§ 371 (c)(1),
(2) Date: Jul. 28, 2015

(87) PCT Pub. No.: WO2014/119940
PCT Pub. Date: Aug. 7, 2014

(65) Prior Publication Data
US 2015/0365153 A1    Dec. 17, 2015

(30) Foreign Application Priority Data

Jan. 31, 2013    (KR) .................. 10-2013-0011276

(51) Int. Cl.
*H04B 7/04*    (2017.01)
*H04B 7/06*    (2006.01)
(Continued)

(52) U.S. Cl.
CPC ......... *H04B 7/0478* (2013.01); *H04B 7/0413* (2013.01); *H04B 7/0417* (2013.01);
(Continued)

(58) Field of Classification Search
CPC . H04L 25/0222; H04B 7/0632; H04B 7/0417; H04B 7/0452; H04B 7/0478; H04B 7/063; H04B 7/0413
See application file for complete search history.

(56) References Cited

U.S. PATENT DOCUMENTS 8,254,999 B2 *  8/2012  Khojastepour ...... H04B 7/0408
                                              370/203
2008/0043874 A1  2/2008  Lee et al.
(Continued)

FOREIGN PATENT DOCUMENTS

JP       2011233969      11/2011
KR    1020080017239       2/2008

*Primary Examiner* — Raj Jain
(74) *Attorney, Agent, or Firm* — The Farrell Law Firm, P.C.

(57) ABSTRACT

A PSCG feedback-based multi-stream multiuser CQI estimation method and apparatus is provided for estimating multi-stream MU-CQI efficiently based on per-stream channel gain feedback. A feedback information transmission method of a terminal in a wireless communication system according to the present disclosure includes estimating a downlink channel based on a channel state information reference signal transmitted by a base station, determining a number of streams based on the estimated downlink chan-
(Continued)

nel, generating the feedback information corresponding to the number of streams, and transmitting the feedback information to the base station.

6 Claims, 5 Drawing Sheets

(51) Int. Cl.
*H04B 7/0413* (2017.01)
*H04B 7/0417* (2017.01)

(52) U.S. Cl.
CPC ........... *H04B 7/0486* (2013.01); *H04B 7/063* (2013.01); *H04B 7/0626* (2013.01); *H04B 7/0632* (2013.01)

(56) References Cited

U.S. PATENT DOCUMENTS

| | | | |
|---|---|---|---|
| 2008/0117815 A1* | 5/2008 | Kim | H04B 7/0452 370/230 |
| 2010/0202553 A1 | 8/2010 | Kotecha et al. | |
| 2011/0026635 A1 | 2/2011 | Kimura et al. | |
| 2012/0014279 A1 | 1/2012 | Miyoshi et al. | |
| 2012/0106519 A1* | 5/2012 | Kishigami | H04B 7/0408 370/336 |
| 2012/0287799 A1 | 11/2012 | Chen et al. | |
| 2012/0300868 A1 | 11/2012 | Chen et al. | |
| 2013/0094380 A1* | 4/2013 | Taoka | H04B 7/0417 370/252 |
| 2015/0365153 A1* | 12/2015 | Kim | H04B 7/0417 370/329 |

* cited by examiner

[Fig. 1]
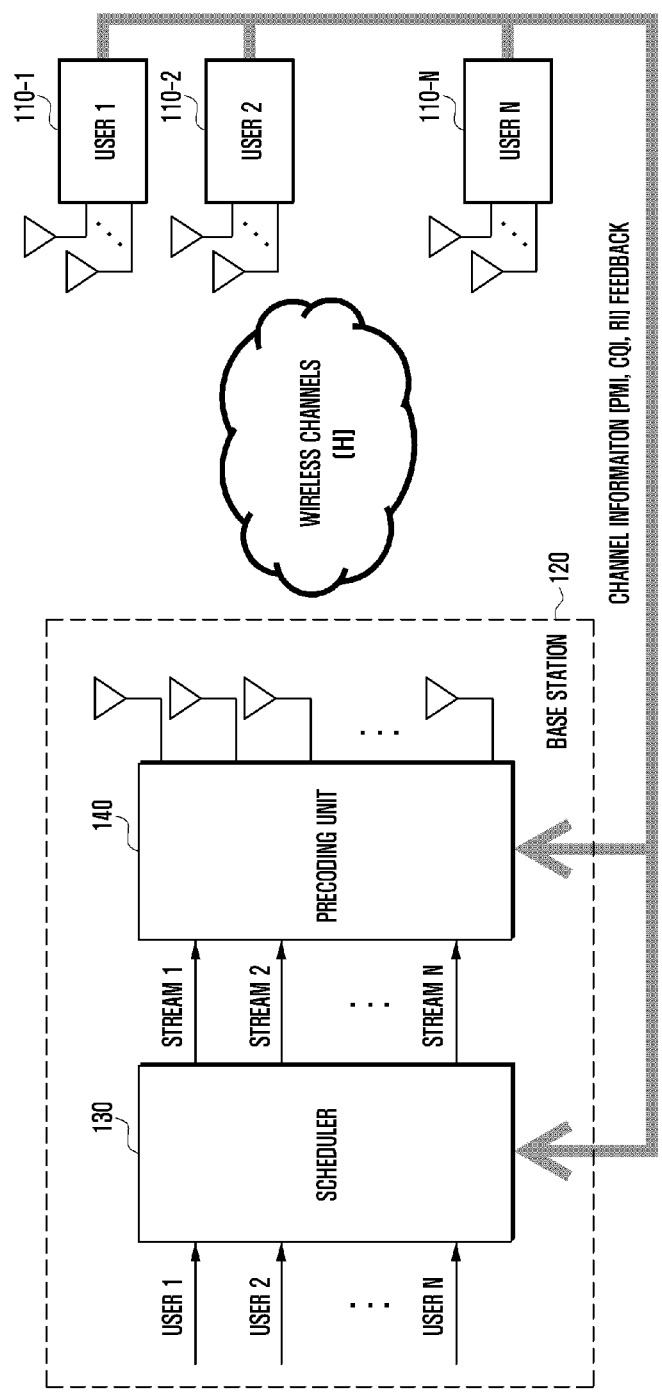

[Fig. 2]
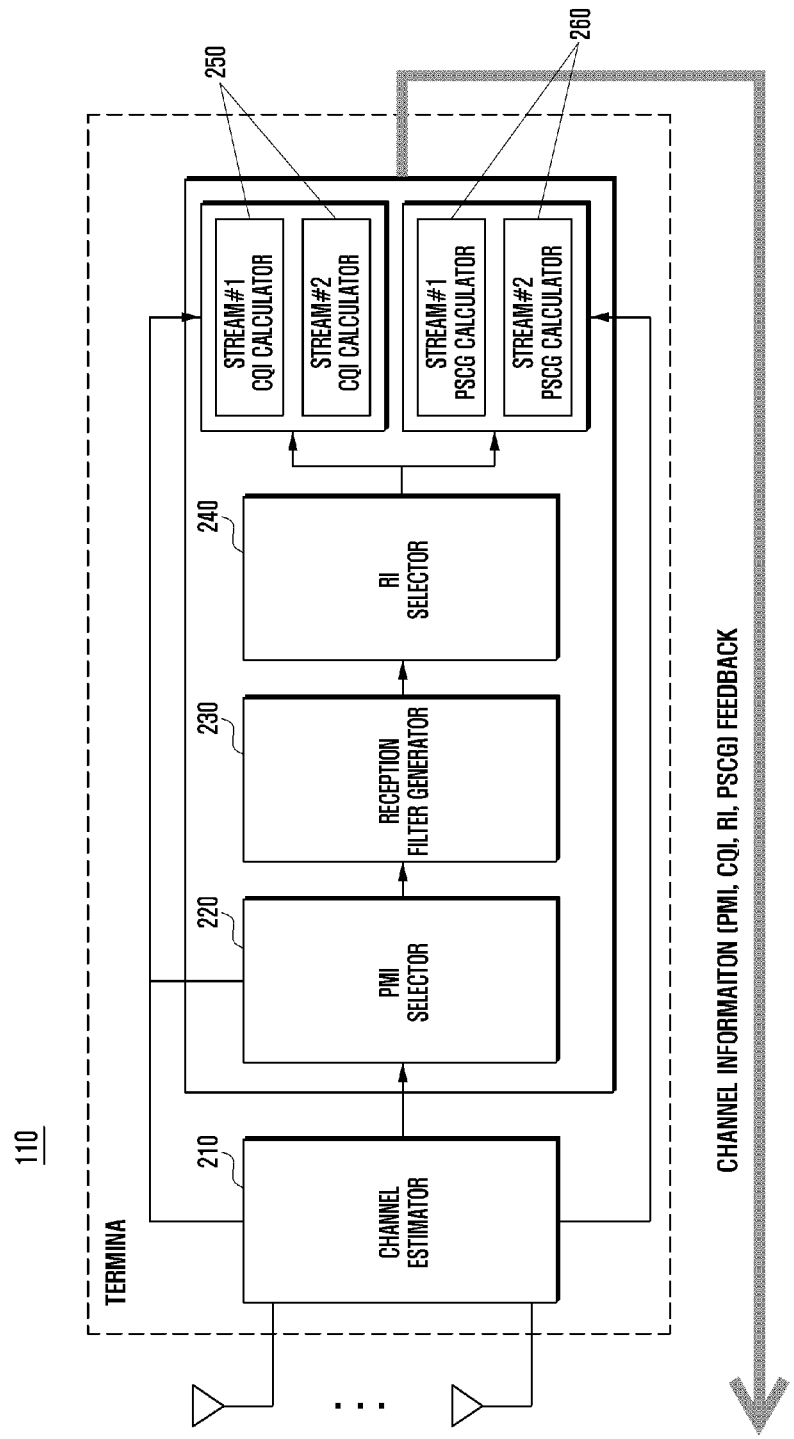

[Fig. 3]
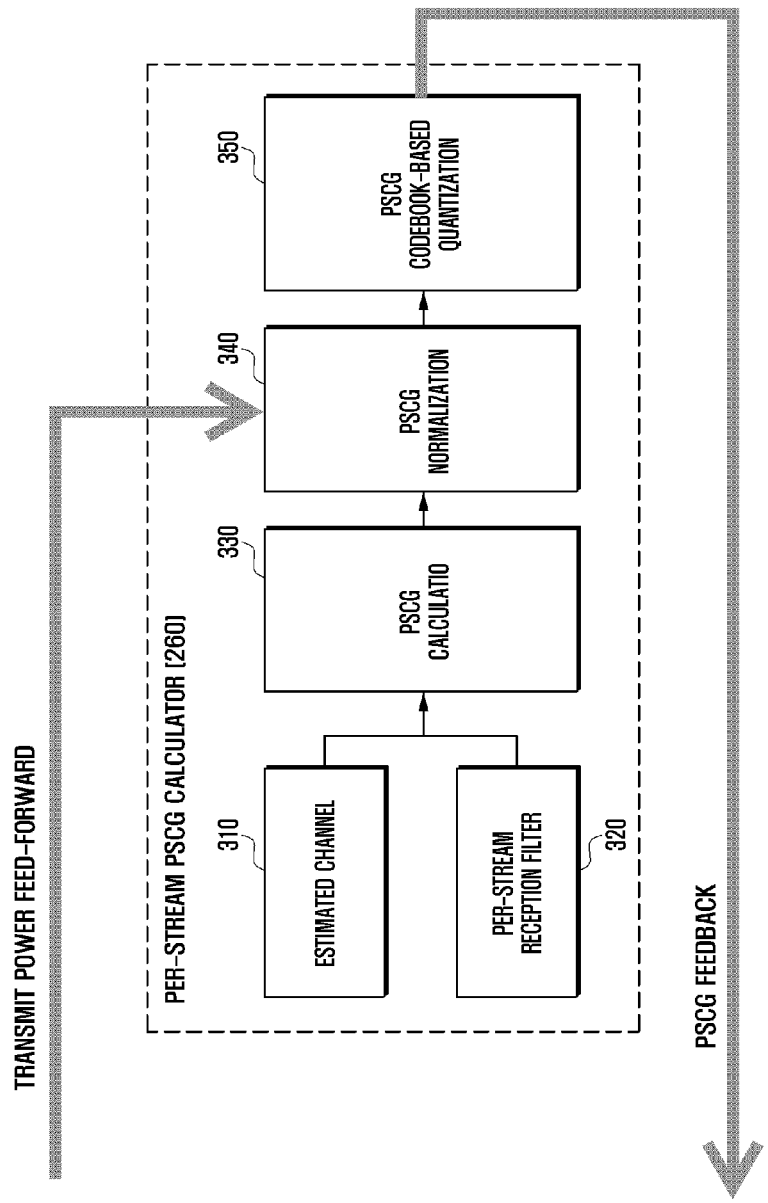

[Fig. 4]
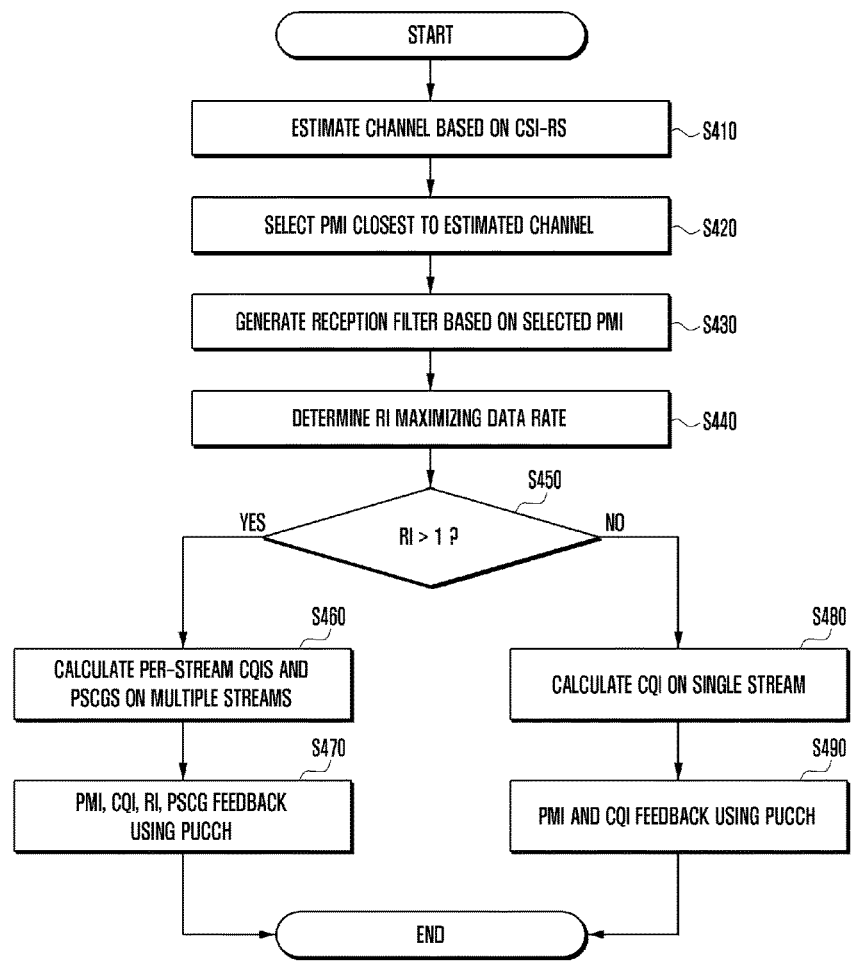
[Fig. 5]
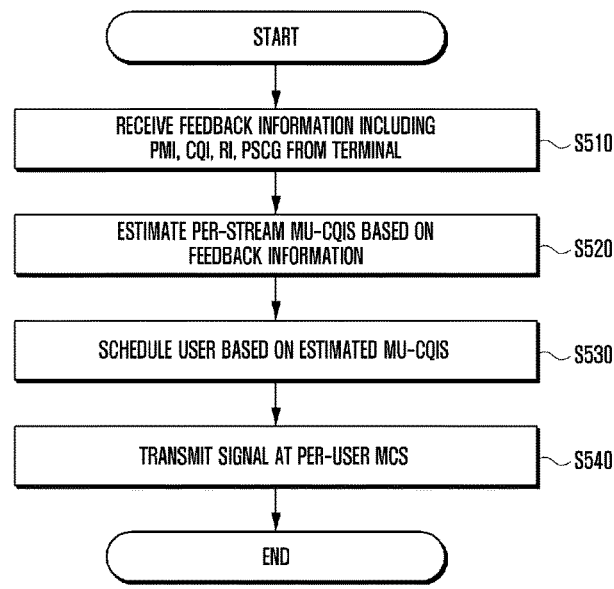

[Fig. 6]
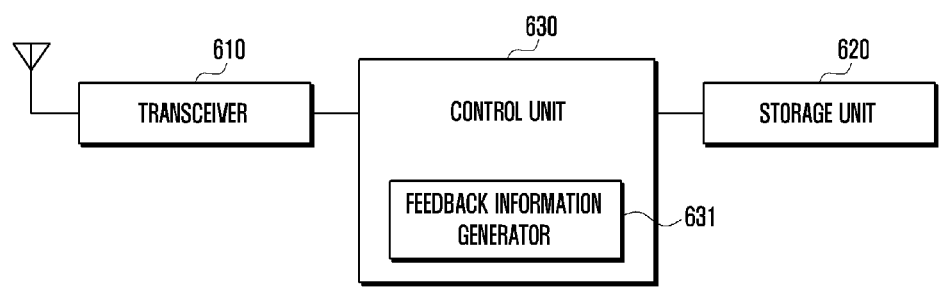
[Fig. 7]
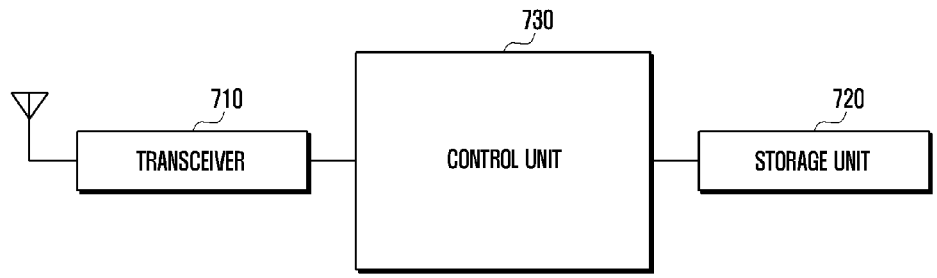

PER-STREAM CHANNEL GAIN FEEDBACK-BASED MULTI-STREAM MU-CQI ESTIMATION METHOD AND APPARATUS

TECHNICAL FIELD

The present disclosure relates a wireless communication system and, in particular, to a method and apparatus for estimating multi-stream MU-CQI based on per-stream channel gain feedback.

BACKGROUND ART

Mobile communication systems have been developed to provide the subscribers with voice communication services on the move. With the rapid advance of technologies, the mobile communication systems have evolved to support high speed data communication services as well as the standard voice communication services. However, the resource shortage and user requirement for higher speed data services spur the evolution of the mobile communication system to more advanced system.

In order to meet such requirements, the 3rd Generation Partnership Project (3GPP) has developed Long Term Evolution (LTE) as one of the promising next generation mobile communication systems. LTE is a technology designed to provide high speed packet-based communication of up to 100 Mbps and aims at commercial deployment around 2010 timeframe. In order to accomplish the aim, a discussion is being held on several schemes: one scheme for reducing the number of nodes located in a communication path by simplifying a configuration of the network, and another scheme for maximally approximating wireless protocols to wireless channels.

A Multiple Input Multiple Output (MIMO) wireless communication system supports Multiuser-MIMO (MU-MIMO) mode for increasing system throughput. Particularly, the LTE-Advanced (LTE-A) is designed to support up to 8 layers transmission.

The data streams of up to 8 layers are allocated to the users depending on the per-user channel conditions and scheduling scheme in Single User MIMO (SU-MIMO) and MU-MIMO modes.

DISCLOSURE OF INVENTION

Technical Problem

Meanwhile, estimating MU-CQI on multiple streams is very difficult as compared to estimating MU-CQI on a single stream. In order to estimate MU-CQI per stream, it is necessary to acquire the information on the reception filters and channels of individual terminals.

However, it requires a large amount of feedback information and thus inefficient in view of overhead. There is therefore a need of a method for estimating MU-CQI on the multiple streams efficiently without relatively low feedback overhead.

Solution to Problem

The present disclosure has been conceived to solve the above problem and aims to provide a method and apparatus for designing a feedback structure capable of overcoming CQI mismatch problem in the MU-MIMO mode supporting multiple streams per user in the MIMO wireless communication system.

In accordance with an aspect of the present disclosure, a feedback information transmission method of a terminal in a wireless communication system is provided. The feedback information transmission method includes estimating a downlink channel based on a channel state information reference signal transmitted by a base station, determining a number of streams based on the estimated downlink channel, generating the feedback information corresponding to the number of streams, and transmitting the feedback information to the base station.

In accordance with another aspect of the present disclosure, a method for receiving, at a base station, feedback information transmitted by a terminal in a wireless communication system is provided. The method includes transmitting channel status information reference signal to the terminal, receiving feedback information including per-stream channel gain informations generated based on the channel status information reference signal, estimating per-stream multiuser channel quality identifiers (MU-CQIs) based on the feedback information, and scheduling transmission based on the estimated per-stream MU-CQIs.

In accordance with another aspect of the present disclosure, a terminal transmitting feedback information in a wireless communication system is provided. The terminal includes a transceiver which transmits and receives signals to and from a base station and a control unit which controls estimating a downlink channel based on a channel state information reference signal transmitted by a base station, determining a number of streams based on the estimated downlink channel, generating the feedback information corresponding to the number of streams, and transmitting the feedback information to the base station.

In accordance with still another aspect of the present disclosure, a base station for receiving and processing feedback information transmitted by a terminal in a wireless communication system is provided. The base station includes a transceiver which transmits and receives signals to an from the terminal and a control unit which controls transmitting channel status information reference signal to the terminal, receiving feedback information including per-stream channel gain informations generated based on the channel status information reference signal, estimating per-stream multiuser channel quality identifiers (MU-CQIs) based on the feedback information, and scheduling transmission based on the estimated per-stream MU-CQIs.

Advantageous Effects of Invention

The per-stream channel gain feedback-based multi-stream MU-CQI estimation method and apparatus of the present disclosure is advantageous in estimating MU-CQI per stream and scheduling based on the estimation result. The MU-CQI estimated with high reliability contributes to acquiring multiuser diversity gain efficiently.

BRIEF DESCRIPTION OF DRAWINGS

FIG. 1 is a block diagram illustrating a feedback-based MIMO wireless communication system to which the present disclosure is applied;

FIG. 2 is a block diagram illustrating a configuration of the terminal for PSCG feedback according to an embodiment of the present disclosure;

FIG. 3 is a block diagram illustrating a configuration of the PSCG calculator of FIG. 2;

FIG. 4 is a flowchart illustrating a terminal procedure of the PSCG feedback-based multi-stream MU-CQI estimation method according to an embodiment of the present disclosure;

FIG. 5 is a flowchart illustrating a base station procedure of the PSCG feedback-based multi-stream MU-CQI estimation method according to an embodiment of the present disclosure;

FIG. 6 is a block diagram illustrating a configuration of a terminal according to an embodiment of the present disclosure; and FIG. 7 is a block diagram illustrating a configuration of the base station according to an embodiment of the present disclosure.

MODE FOR THE INVENTION

Exemplary embodiments of the present disclosure are described with reference to the accompanying drawings in detail. The same reference numbers are used throughout the drawings to refer to the same or like parts. Detailed description of well-known functions and structures incorporated herein may be omitted to avoid obscuring the subject matter of the present disclosure.

Typically, the MIMO wireless communication system supports MU-MIMO to increase the system throughput. Particularly, LTE-A adds a new transmission mode supporting up to 8-layer transmission. The data streams corresponding to up to 8 layers are allocated to the users appropriately according to the user's channel conditions and scheduling scheme in the SU-MIMO and MU-MIMO modes.

In the MIMO wireless communication system, the transmission mode is determined based on the channel information feedback of the terminal. The terminal feeds back the information including Precoding Matrix (PMI), Rank Indicator (RI), and Channel Quality Indicator (CQI).

The PMI is an index of a codeword matrix most similar to the channel of the terminal among the codeword matrices in a predefined codebook. The terminal selects the PMI maximizing Signal-to-Noise Ratio (SNR) under the assumption of SU-MIMO mode and sends the selected PMI to the base station.

The RI indicates the rank of the channel generated with the precoding matrix indicated by the PMI selected by the terminal. In more detail, the user using multiple antennas determines the number of streams which is capable of maximizing its data rate and feeds back the determination result.

The CQI indicates a Modulation and Coding Scheme (MCS) fulfilling the Block Error Rate (BLER) with the per-stream SNR determined based on the PMI and RI selected by the terminal. The terminal feeds back an index selected in the MCS table to the base station.

In this case, the CQI is also computed under the assumption of SU-MIMO mode and, if RI is 2 or greater, plural CQIs are transmitted to the base station. The CQI is determined under the assumption that the PMI transmitted by the terminal is applied. That is, the terminal generates the CQI under the assumption that the base station performs precoding with the PMI which it has reported to the base station.

The base station performs scheduling and determines the transmission precoder and transmission mode based on the feedback informations. The inter-user interference occurring in the MU-MIMO transmission mode is controlled through appropriate precoding.

The base station re-computes per-stream MU-CQIs based on the per-stream SU-CQIs fed back depending on the transmission mode. In the SU-MIMO mode, the SU-CQI fed back by each terminal is used without any modification. In the MU-MIMO mode, per-stream MU-CQIs are estimated based on the precoding scheme, number of co-scheduled users, and number of streams per user that are acquired from the SU-CQI feedbacks.

The base station estimates the MU-CQI based on the channel information fed back by the terminal. In this case, there may be difference between the estimated MU-CQI and the MU-CQI supportable when the terminal receives the actual MU-MIMO transmission, and this difference is referred to as mismatch.

If the measured MU-CQI is greater than the actual channel quality, this does not fulfill the BLER requirement of each terminal and thus cannot guarantee the transmission quality. If the measured MU-CQI is less than the actual channel quality, this guarantees transmission quality due to the data rate lower than the available channel capacity, resulting in decrease of frequency utilization efficiency.

Accordingly, it is important to estimate the MU-CQI accurately.

Estimating MU-CQI of multiple streams is very complex as compared to estimating MU-CQI of a single stream. In order to estimate per-stream MU-CQIs, it is necessary to acquire the information on the reception filter of each terminal and channel information.

However, the reception filter and channel information-based MU-CQI estimation requiring large amount of feedback is inefficient in view of overhead. There is therefore a need of a method for estimating the MU-CQIs of multiple streams efficiently with low feedback overhead.

The present disclosure proposes a method and apparatus capable of overcoming the CQI mismatch problem in the MU-MIMO mode.

Particularly, the present disclosure proposes a MU-CQI estimation method that is capable of estimating per-stream MU-CQIs of multiple streams accurately based on the per-stream channel gain (PSCG) fed back by individual terminals.

The method and apparatus of the present disclosure is implemented a terminal which calculates per-stream channel gains, quantizes the per-stream channel gains, and transmits the quantization result; and a base station which estimates multi-stream MU-CQIs based on the per-stream channel gains fed back by the terminal.

FIG. 1 is a block diagram illustrating a feedback-based MIMO wireless communication system to which the present disclosure is applied.

As shown in FIG. 1, each of the user terminals 110-1, 110-2, and 110-N receives Channel State Information Reference Signal (CSI-RS) transmitted by the base station 120 and estimates downlink channel using the CSI-RS. The terminal computes PMI, CQI, and RI, and RI based on the downlink channel estimation result and transmits them to the base station.

The base station 120 uses the feedback information for user scheduling, transmission precoding calculation, and MU-CQI estimation. The base station schedules the terminals through the above procedure.

The base station transmits DeModulation Reference Channel (DMRS) to the terminal in the Physical Downlink Shared Channel (PDSCH). The DMRS is transmitted in a time-frequency region of the PDSCH for use in channel estimation at the terminal for receiving PDSCH.

That is, the terminal estimates channel using the DMRS and receives the PDSCH based on the channel estimation result.

The scheduler 130 of the base station 120 schedules the user on the frequency (or time) and spatial resources. In the process, the number of streams per user is determined. Although it is typical to determine the number of streams per terminal is determined based on the RI transmitted by the terminal, it may be possible, if necessary, to allocate a number of streams less than the value indicated by the RI fed back by the UE (particularly, in MU-MIMO mode). This is because the RI fed back by the terminal is calculated under the assumption of SU-MIMO mode. The total number of data streams is determined in a range with exceeding the maximum available number of layers supported by the base station.

Since inter-user interference exists in the MU-MIMO, it is necessary to re-estimate the MU-CQI based on the SU-CQI transmitted by the terminal. Since the MU-CQI estimation accuracy influences the system performance significantly, it is possible to improve the resource management efficiency and system throughput by increasing the MU-CQI estimation accuracy.

FIG. 2 is a block diagram illustrating a configuration of the terminal for PSCG feedback according to an embodiment of the present disclosure. As shown in FIG. 2, the terminal according to an embodiment of the present disclosure includes a channel estimator 210, a PMI selector 220, a reception filter generator 230, an RI selector 240, CQI calculators 250, and PSCG calculators 260.

The channel estimator 210 receives the reference signal, e.g. CSI-RS, transmitted by the base station for use in estimating radio channel status between the terminal and the base station.

The PMI selector 220 selects a PMI maximizing the reception SNR of the terminal. As described above, the PMI indicates the codeword matrix most similar to the channel of the terminal among the codeword matrices in the predefined codebook. According to an embodiment of the present disclosure, the PMI selector 220 determines the PMI under the assumption of the SU-MIMO mode.

The terminal using multiple antennas may select one reception antenna or a plurality antennas to operate in diversity reception mode or multiplexing reception mode.

In order to operate in the diversity or multiplexing reception mode, an appropriated reception filter is required. The reception filter is determined depending on how to combine the signals received by the plural reception antennas and process the combined signals.

The reception filter to be used by the terminal may be determined by the reception filter generator 230 in consideration of the channel estimated based on the CSI-RS and the precoding indicated by the PMI selected by the terminal.

The RI selector 240 selects the best RI improving the data rate of the terminal according to the reception filter.

The per-stream CQI calculators 250 calculate the best CQI to the number of streams determined by the terminal in selecting RI. The per-stream CQI calculators 250 feed back the calculated per-stream CQIs to the base station.

The PSCG calculators 260 calculate the per-stream PSCGs optimized to the number of streams determines by the terminal in selecting RI. The per-stream PSCG calculators 260 feed back the calculated per-stream PSCGs to the base station.

Here, the per-stream PSCG denotes the channel gain information per stream and may be defined as the amplification degree of a certain signal with the selected reception filter.

Though the above procedure, the terminal feeds back PMI, RI, per-stream CQI, and per-stream PSCG to the base station.

Then the base station determines the target terminals and precoding for use in downlink transmission based on the RIs, PMIs, CQIs, and PSCGs fed back by a plurality of terminals.

The apparatus of calculating and feeding back the PSCG according to an embodiment of the present disclosure help overcome the CQI mismatch problem. The PSCG feedback is used at the base station for estimating per-MU-CQIs.

FIG. 3 is a block diagram illustrating a configuration of the PSCG calculator of FIG. 2.

Referring to FIG. 3, the PSCG 330 is calculated based on the estimated channel 310 and the per-stream reception filter 320.

In the MU-MIMO mode, the inter-user interference is amplified through the reception filter of the terminal. At this time, in order for the base station to estimate the inter-user interference amount at the terminal, it is necessary to acquire the information on the downlink channel of the corresponding terminal, precoding matrices of other users, and the reception filter of the corresponding terminal.

Since the transmission precoding matrix is known to the base station, the informations on the downlink channel and reception filter are all required in addition. At this time, since the separate transmissions of the channel information and the reception filter information increase the overhead, the present disclosure proposes transmitting only the PSCG reflecting the amplification degree of the inter-user interference at the terminal.

According to an embodiment of the present disclosure, the calculated PSCG is quantized to be fed back. At this time, in order to normalize the quantization level of the PSCG, the base station feeds forward the information on the transmit power. The terminal normalizes the PSCG based on the transmit power feeds back the corresponding PSCG codebook index quantized using the PSCG codebook as denoted by reference number 350. The PSCG codebook is agreed and shared between the base station and the terminal without limit in type.

According to an embodiment of the present disclosure, the low feedback overhead improves the efficiency of the per-stream MU-CQI estimation.

FIG. 4 is a flowchart illustrating a terminal procedure of the PSCG feedback-based multi-stream MU-CQI estimation method according to an embodiment of the present disclosure.

The terminal first receives the CSI-RS transmitted by the base station and estimates the downlink channel using the CSI-RS at operation S410. The terminal selects a PMI closest to the estimated channel at operation S420.

Next, the UE generates a reception filter based on the selected PMI at operation S430. The terminal determines the RI capable of allowing for the maximum available data rage based on the reception filter at operation S440.

Next, the terminal determines whether the RI is greater than 1 at operation S450. If the RI is 1, this means that the data is transmitted on a single stream and, if RI is equal to or greater 2, this means that the data is transmitted on multiple streams.

If it is determined that RI is greater than 1, the terminal operates in the multi-stream mode and computes per-stream CQIs and PSCGs at operation S460. At operation S470, the terminal feedbacks the feedback information including PMI, CQI, RI, and PSGS selected and calculated at previous operation. In this case, the feedback information may be transmitted to the base station through Physical Uplink Control Channel (PUCCH).

Otherwise if it is determined that the RI is 1 at operation S450, the terminal calculates CQI for single stream at operation S480. At operation S490, the terminal transmits the feedback information including PMI, CQI, and RI selected and calculated at previous operation. In this case, the feedback information may be transmitted to the base station through PUCCH.

FIG. 5 is a flowchart illustrating a base station procedure of the PSCG feedback-based multi-stream MU-CQI estimation method according to an embodiment of the present disclosure.

In the drawing, a process of transmitting the reference signal such as CSI-RS for use in channel estimation of the terminal is omitted.

The base station receives feedback information transmitted by the terminal at operation S510. The feedback information includes PMI, RI, and CQI for single stream transmission or PMI, RI, per-stream CQI, and PSCG for multi-stream transmission. The embodiment of FIG. 5 is directed to the case where the user operates in the multi-stream mode.

The base station estimates per-stream MU-CQI based on the received feedback information at operation S520. The base station schedules users based on the estimated MU-CQI at operation S530.

The base station transmits a signal at the best per-user MCS level at operation S540.

The MU-CQI estimated with high reliability through the above procedure is capable of contributing to multi-user diversity efficiently.

FIG. 6 is a block diagram illustrating a configuration of a terminal according to an embodiment of the present disclosure. As shown in FIG. 6, the terminal includes a transceiver 610, a storage unit 620, and a control unit 630.

The transceiver 610 is responsible for transmitting and receiving signals to and from a base station. Particularly in an embodiment of the present disclosure, the transceiver 610 may receive the reference signal (e.g. CSI-RS) transmitted by the base station and transmits feedback information including channel status information to the base station.

The storage unit 620 may store various programs concerning the operation of the terminal.

The control unit 630 controls the signal flows among the components of the terminal to generate feedback information and report the feedback information to the base station. For this purpose, the control unit 630 may include a feedback information generator 631.

The feedback information generator 631 estimates downlink channel based on the CSI-RS transmitted by the base station and determines the number of streams based on the estimated downlink channel. The feedback information generator 631 may generates the feedback information in correspondence to the number of streams and transmits the feedback information to the base station.

Particularly in an embodiment of the present disclosure, the feedback information generator 631 selects a PMI based on the downlink channel estimated at previous operation and generates a reception filter based on the selected precoding matrix in determining the number of streams. The feedback information generator 631 may determine the RI corresponding to the number of streams making it possible to acquiring the maximum available data rate according to the reception filter and determines the value indicated by the RI as the number of streams.

According to an embodiment of the present disclosure, if the number of streams is equal to or greater than 2, the feedback information generator 631 generates the feedback information including per-stream CQI and PSCG. Otherwise if the number of streams is 1, the feedback information generator 631 generates the feedback information including the channel quality information on the single stream.

According to an embodiment of the present disclosure, the feedback information generator 631 may control the terminal to normalize the PSCG information, quantizes the PSCG based on a codebook, and generates the feedback information including the quantized PSCG information.

FIG. 7 is a block diagram illustrating a configuration of the base station according to an embodiment of the present disclosure. As shown in FIG. 7, the base station includes a transceiver 710, a storage unit 720, and a control unit 730.

The transceiver 710 is responsible for transmitting and receiving signals to and from the terminals. Particularly in an embodiment of the present disclosure, the transceiver 710 may transmit the reference signal (e.g. CSI-RS) for use in channel estimation of the terminal and receive feedback information including the channel status information transmitted by the terminal.

The storage unit 720 may store various programs concerning the operations of the base station.

The control unit 730 controls signal flows among the components of the base station to estimate the multi-stream MU-CQI and perform scheduling based thereon.

In more detail, the control unit 730 controls the base station to transmit CSI-RS to the terminal and receives the feedback information transmitted by the terminal which includes the PSCG generated based on the CSI-RS.

Here, here the feedback information may include the CQI on the corresponding stream when the number of streams (RI=1) is 1 or the per-stream CQI and PSCG when the number of streams is equal to or greater than 2.

The control unit 730 estimates the per-stream MU-CQI based on the feedback information from the terminal and performs scheduling based on the estimated per-stream MU-CQI. The control unit 730 determines the best MCS level per user and transmits signal at the determined MCS level.

The PSCG feedback-based multi-stream MU-CQI estimation method and apparatus of the present disclosure is capable of overcoming the CQI mismatch problem through PSCG information-based MU-CQI estimation, thereby acquiring multiuser diversity and improving system throughput.

As described above, the per-stream channel gain feedback-based multi-stream MU-CQI estimation method and apparatus of the present disclosure is advantageous in estimating MU-CQI per stream and scheduling based on the estimation result. The MU-CQI estimated with high reliability contributes to acquiring multiuser diversity gain efficiently.

Although preferred embodiments of the disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

The invention claimed is:

1. A method of a terminal in a wireless communication system, the method comprising:
   estimating a downlink channel based on a channel state information reference signal transmitted by a base station;
   determining a number of streams based on the estimated downlink channel;

generating, if the number of streams is 1, first feedback information including channel quality information on the stream;

generating, if the number of streams is greater than or equal to 2, second feedback information including channel quality information on each of the streams and channel gain information on each of the streams; and transmitting the first feedback information or the second feedback information to the base station, wherein the channel gain information on each of the streams is determined based on a degree of amplification for an interference according to a reception mode of the terminal.

2. The method of claim 1, wherein determining the number of streams comprises:

selecting a precoding matrix index based on the estimated downlink channel;

generating a reception filter based on the selected precoding index; and determining a rank indicator corresponding to the number of streams which maximizes a data rate of the terminal with the reception filter.

3. The method of claim 1, wherein generating the second feedback information comprises:

normalizing the channel gain information for each of the streams;

quantizing the normalized channel gain information for each of the streams based on a codebook; and generating the second feedback information including the quantized channel gain information for each of the streams.

4. A terminal in a wireless communication system, the terminal comprising:

a transceiver which transmits and receives signals to and from a base station; and a controller connected to the transceiver and configured to:

estimate a downlink channel based on a channel state information reference signal transmitted by the base station, determine a number of streams based on the estimated downlink channel, generate, if the number of streams is 1, first feedback information including channel quality information on the stream, generate, if the number of streams is greater than or equal to 2, second feedback information including channel quality information on each of the streams and channel gain information on each of the streams, and transmit the first feedback information or the second feedback information to the base station, wherein the channel gain information on each of the streams is determined based on a degree of amplification for an interference according to a reception mode of the terminal.

5. The terminal of claim 4, wherein the controller is further configured to:

select a precoding matrix index based on the estimated downlink channel, generate a reception filter based on the selected precoding index, and determine a rank indicator corresponding to the number of streams which maximizes a data rate of the terminal with the reception filter.

6. The terminal of claim 4, wherein the controller is further configured to:

normalize the channel gain information for each of the streams, quantize the normalized channel gain information for each of the streams, and generate the second feedback information including the quantized channel gain information for each of the streams.

* * * * *